United States Patent
Akiyama (10) Patent No.: US 6,513,150 B1
(45) Date of Patent: Jan. 28, 2003

(54) METHOD OF GENERATING MESH FOR PROCESS SIMULATION

(75) Inventor: Yutaka Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 154 days.

(21) Appl. No.: 09/666,091

(22) Filed: Sep. 21, 2000

(30) Foreign Application Priority Data

Oct. 26, 1999 (JP) ............................................. 11-304330

(51) Int. Cl.[7] .......................... G06F 17/50; G06T 15/30
(52) U.S. Cl. ............................... 716/20; 703/2; 345/423
(58) Field of Search ...................... 716/1–21

(56) References Cited

U.S. PATENT DOCUMENTS

| | | | | |
|---|---|---|---|---|
| 4,933,889 A | * | 6/1990 | Meshkat et al. | 345/423 |
| 5,010,501 A | * | 4/1991 | Arakawa | 345/420 |
| 5,214,752 A | * | 5/1993 | Meshkat et al. | 345/423 |
| 5,768,156 A | * | 6/1998 | Tautges et al. | 716/20 |
| 5,798,764 A | * | 8/1998 | Akiyama | 345/423 |
| 5,838,594 A | * | 11/1998 | Kojima | 716/20 |
| 5,880,977 A | * | 3/1999 | Syo | 716/20 |
| 5,936,869 A | * | 8/1999 | Sakaguchi et al. | 703/1 |
| 6,198,486 B1 | * | 3/2001 | Junkins et al. | 345/419 |
| 6,226,405 B1 | * | 5/2001 | Furuhata et al. | 382/197 |
| 6,259,453 B1 | * | 7/2001 | Itoh et al. | 345/423 |
| 6,266,062 B1 | * | 7/2001 | Rivara | 345/419 |
| 2001/0041971 A1 | * | 11/2001 | Syo | 703/2 |

FOREIGN PATENT DOCUMENTS

JP 11-260812 9/1999

OTHER PUBLICATIONS

"Semiconductor Process Device Simulation Technology", published by *Realized Co., Ltd.*, 1990, pp. 79–89, Part 1 "Process", Chapter 2 "Proces Simulation", Section 3 "Simulation of Two–Dimensional Oxidation".

\* cited by examiner

Primary Examiner—Matthew Smith
Assistant Examiner—Andrea Liu
(74) Attorney, Agent, or Firm—Young & Thompson (57) ABSTRACT

Region boundary line segments are acquired, and simplification values of mesh points on each of the region boundary line segments are calculated. The simplification value of a fixed mesh point is set to a value sufficiently larger than a reference simplification value. The mesh point whose simplification value is the smallest is selected from the mesh points on each region boundary line segment. If the simplification value of the selected mesh point is positive and smaller than the reference simplification value, then the simplification value of the selected mesh point is equally distributed to the mesh points on both sides of and adjacent to the selected mesh point, and the selected mesh point is deleted. The above process is repeated until the simplification values of all the mesh points in the region boundary line segments become greater than the reference simplification value.

4 Claims, 7 Drawing Sheets

METHOD OF GENERATING MESH FOR PROCESS SIMULATION

BACKGROUND OF THE INVENTION

1. Field of the Invention

The present invention relates to a method of generating a mesh for process simulation.

2. Description of the Related Art

Process simulators calculate various semiconductor fabrication processes including an oxidization process, a diffusion process, an ion implantation process, etc. with a computer to predict internal physical quantities and configurations such as impurity profiles for transistors.

If transistors are optimized to make semiconductor devices exhibit best electric characteristics using a process simulator, then the cost and period of time for fabricating such semiconductor devices can be much smaller than if a prototype LSI circuit were actually produced.

With a process simulator, since various semiconductor fabrication processes are calculated by a computer, each of the processes incorporate a model equation. In LSI circuits, devices are separated by LOCOS, trenches, etc. so that the devices will not electrically affect each other. The tendency in recent years for smaller microelectronic devices requires device separation simulation for LOCOS, trenches, etc., resulting in efforts to achieve two-dimensional process simulation.

One process for calculating two-dimensional LOCOS oxidization is disclosed in "Semiconductor process device simulation technology", published by Realize Co., Ltd., pages 79–89, Part 1 "Process", Chapter 2 "Process simulation", Section 3 "Simulation of two-dimensional oxidization".

According to the disclosed process, an oxidization rate is computed from an oxidant concentration, how much an $Si/SiO_2$ interface moves is calculated at a certain time interval, and a configurational change is calculated from the displacement of the $Si/SiO_2$ interface.

Figure 1:
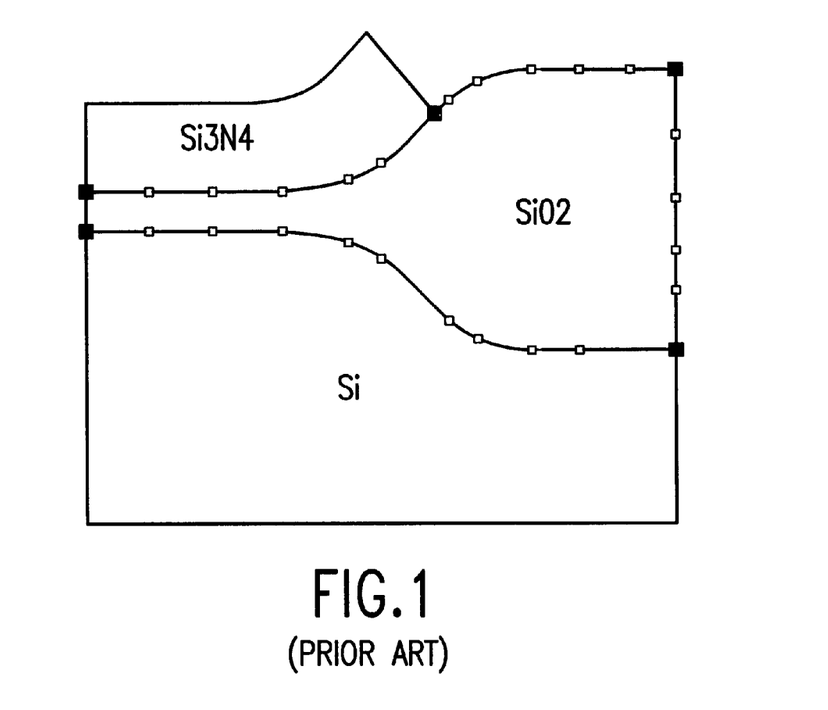
FIG. 1 is a diagram showing a LOCOS structure calculated from the oxidization computation.

FIG. 1 of the accompanying drawings show a LOCOS structure calculated from the oxidization computation. As described above, a configurational change is calculated from the displacement of the $Si/SiO_2$ interface. Since the displacement is produced as a result of the numerical calculation, it contains a small error, resulting in an unwanted fluctuation of the interface between the materials.

According to the process simulation, after the oxidization computation, a redistribution of the impurity distributed in Si is calculated by way of diffusion computation. In order to perform the diffusion computation, it is necessary to generate a mesh for the diffusion computation, and any unwanted fluctuations need to be reduced as much as possible for the generation of such a mesh.

Japanese patent application No. 10-082541 discloses an invention relating to a method of reducing unwanted fluctuations after the oxidization computation. According to the disclosed invention, in the LOCOS configuration shown in FIG. 1, an $Si/SiO_2$ boundary, an $SiO_2$/ambient boundary, and an $SiO_2/Si_3N_4$ boundary are separated into blocks as shown in FIG. 2 of the accompanying drawings, and unwanted mesh points are reduced in each of the blocks thereby to reduce unwanted fluctuations.

Figure 3:
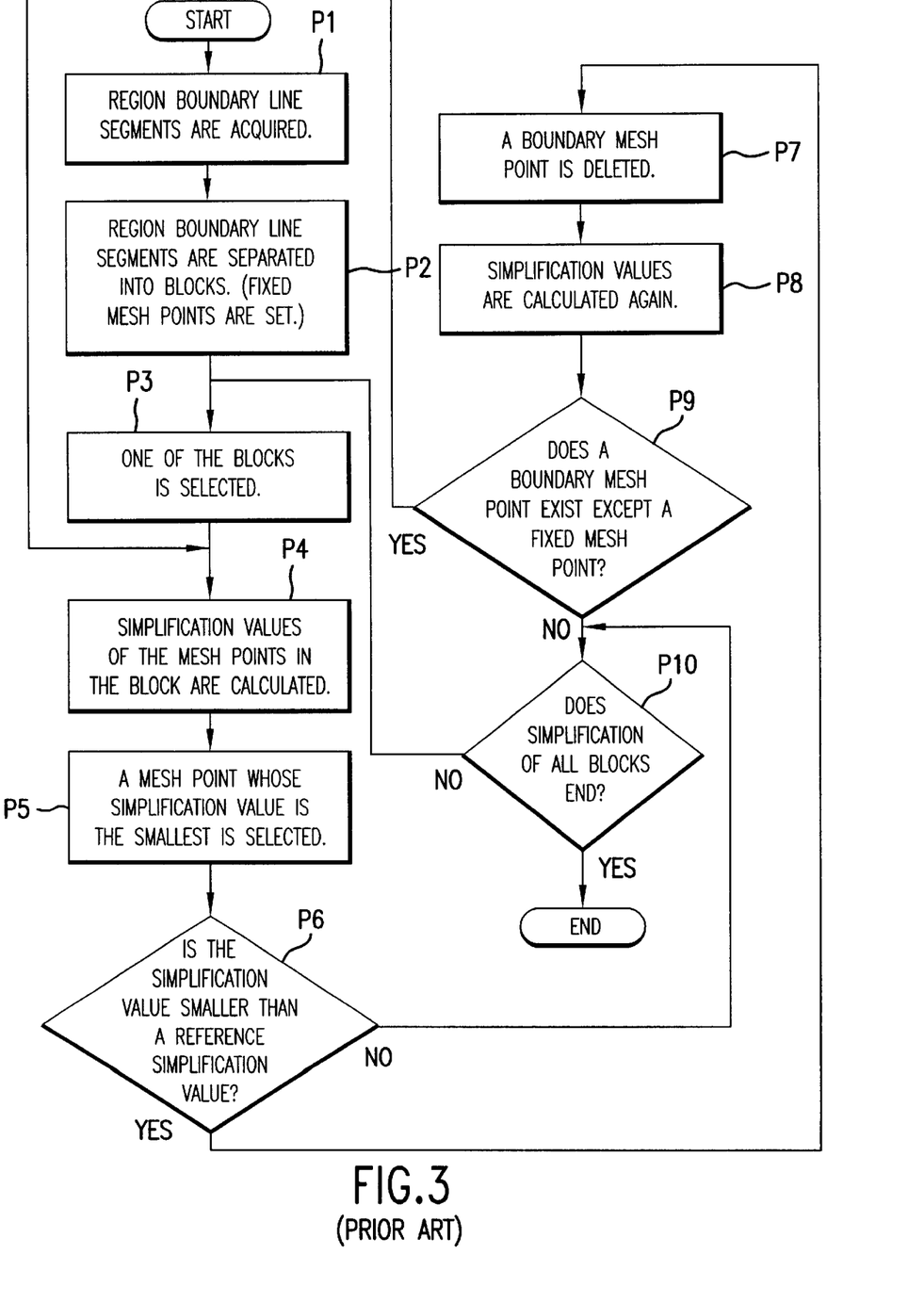
FIG. 3 is a flowchart of an operation sequence of a conventional method.

The process according to the invention disclosed in Japanese patent application No. 10-082541 will be described below with reference to FIG. 3 of the accompanying drawings.

In step P1, region boundary line segments are acquired. The region boundary line segments include the $Si/SiO_2$ boundary, the $SiO_2$/ambient boundary, and the $SiO_2/Si_3N_4$ boundary.

Figure 2:
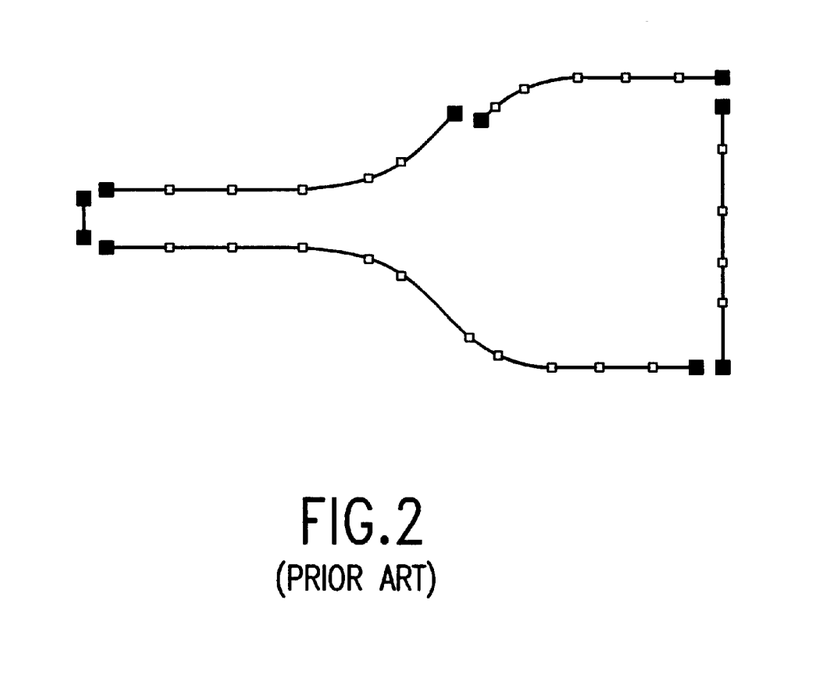
FIG. 2 is a diagram showing an $Si/SiO_2$ boundary, an $SiO_2$/ambient boundary, and an $SiO_2/Si_3N_4$ boundary that are separated into blocks in the LOCOS configuration.

In step P2, the region boundary line segments are separated into blocks at nodes where three or more materials contact each other, as shown in FIG. 2.

In step P3, one of the blocks is selected. In step P4, simplification values $\epsilon$ of the mesh points in the selected block are calculated. A simplification value $\epsilon$ represents a distance that the mesh points move when the corresponding mesh point is deleted. The smaller the simplification value $\epsilon$, the smaller the effect that the simplification has on a change in the configuration.

In step P5, a mesh point whose simplification value is the smallest in the block is selected.

In step P6, if the simplification value of the selected mesh point is smaller than a reference simplification value, then a boundary mesh point is deleted in step P7.

Since the simplification values of mesh points in the vicinity of the deleted boundary mesh point are changed, simplification values are calculated again in step P8.

The above process is repeated for each block until the simplification values of the mesh points in the block become greater than the reference simplification value.

A specific example of how the method according to the invention disclosed in Japanese patent application No. 10-082541 operates will be described below with reference to FIGS. 4(A) through 4(C) of the accompanying drawings.

Figure 4A:
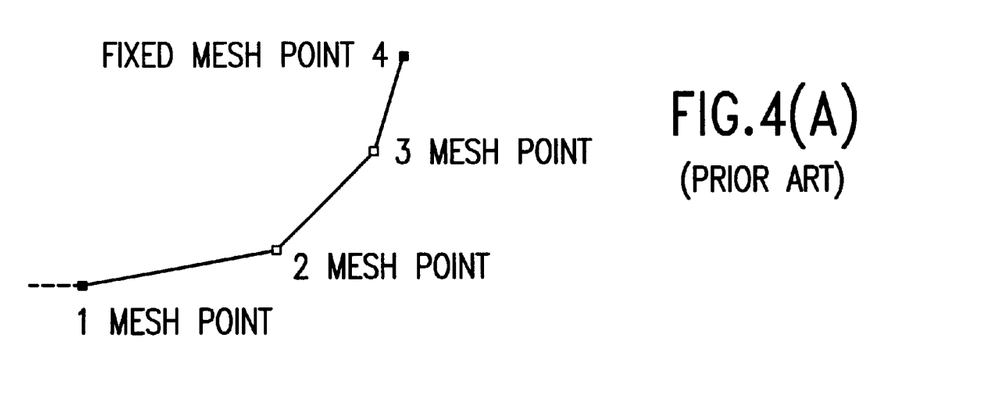
FIGS. 4(A), 4(B), and 4(C) are diagrams showing the manner in which the conventional method operates.

A point where three materials contact each other is defined as fixed mesh point 4, and the configuration is divided into blocks as shown in FIG. 4(A).

Figure 4B:
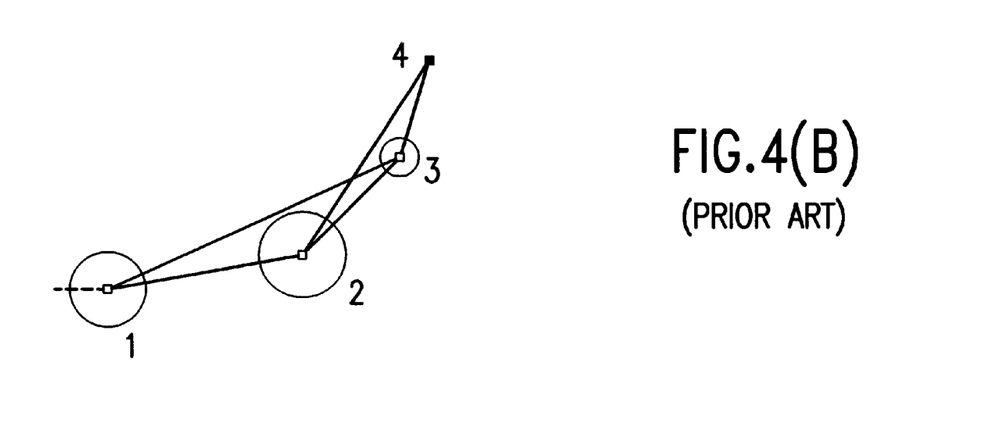
Figure 4C:
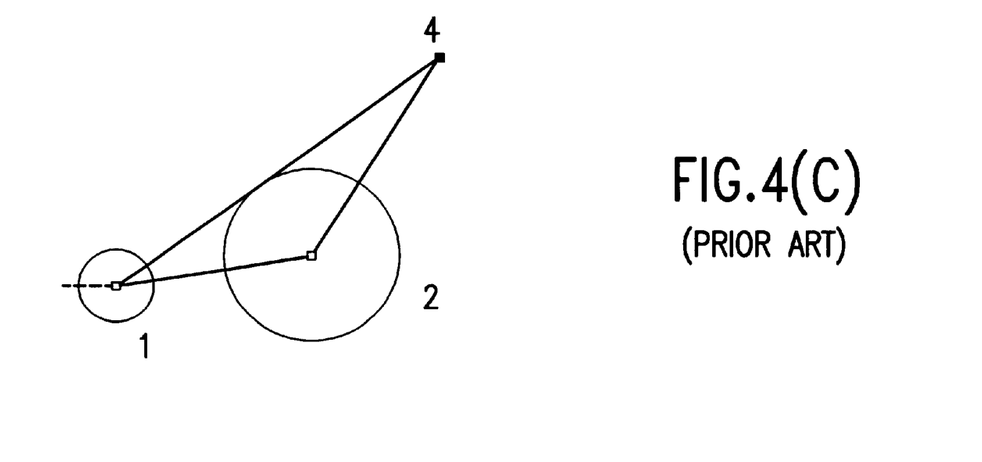

Simplification values of mesh points 1, 2, 3 in each block are calculated as shown in FIG. 4(B).

Of the mesh points in the block, mesh point i whose simplification value is the smallest is selected, i.e., mesh point 3 shown in FIG. 4(B) is selected. If the simplification value of selected mesh point i is smaller than a predetermined reference value, then mesh point i is deleted, and simplification values of the mesh points are calculated again.

The above process is repeated for each block until the simplification values of the mesh points in the block become greater than the reference value.

One problem of the above conventional method is that it is time-consuming to simplify the configuration because it is necessary to recalculate simplification values each time a node or mesh point is deleted.

SUMMARY OF THE INVENTION

It is therefore an object of the present invention to provide a method of generating a mesh for process simulation by simplifying a configuration at a high speed for reducing the period of time required for calculations.

According to an aspect of the present invention, there is provided a method of generating a mesh for process simulation, comprising the steps of (a) acquiring region boundary line segments, (b) calculating simplification values of mesh points on each of the region boundary line segments, (c) defining a node where at least three materials contact each other on each region boundary line segment as a fixed mesh point, and setting the simplification value of the fixed mesh point to a value sufficiently larger than a reference simplification value thereby to make the fixed mesh point immovable, (d) selecting the mesh point whose simplification value is the smallest from the mesh points on each region boundary line segment, (e) if the simplification value of the selected mesh point is smaller than the reference simplification value, equally distributing the simplification value of the selected mesh point to the mesh points on both sides of and adjacent to the selected mesh point, (f) deleting the selected mesh point, and (g) repeating the steps (d) through (f) until the simplification values of all the mesh points on each region boundary line segment become greater than the reference simplification value.

According to another aspect of the present invention, there is provided a method of generating a mesh for process simulation, comprising the steps of (a) acquiring region boundary line segments, (b) calculating simplification values of mesh points on each of the region boundary line segments, (c) defining a node where at least three materials contact each other on each region boundary line segment as a fixed mesh point, and setting the simplification value of the fixed mesh point to a value sufficiently larger than a reference simplification value thereby to make the fixed mesh point immovable, (d) selecting the mesh point whose simplification value is the smallest from the mesh points on each region boundary line segment, (e) if the simplification value of the selected mesh point is smaller than the reference simplification value, distributing the simplification value of the selected mesh point to the mesh points on both sides of and adjacent to the selected mesh point, at ratios depending on the distances from the selected mesh point to the mesh points, (f) deleting the selected mesh point, and (g) repeating the steps (d) through (f) until the simplification values of all the mesh points on each region boundary line segment become greater than the reference simplification value.

According to still another aspect of the present invention, there is provided a method of generating a mesh for process simulation, comprising the steps of (a) acquiring region boundary line segments, (b) calculating simplification values of mesh points on each of the region boundary line segments, (c) defining a node where at least three materials contact each other on each region boundary line segment as a fixed mesh point, and setting the simplification value of the fixed mesh point to a value sufficiently larger than a reference simplification value thereby to make the fixed mesh point immovable, (d) selecting the mesh point whose simplification value is the smallest from the mesh points on each region boundary line segment, (e) if the simplification value of the selected mesh point is positive and smaller than the reference simplification value, equally distributing the simplification value of the selected mesh point to the mesh points on both sides of and adjacent to the selected mesh point, (f) setting the simplification value of the selected mesh point to a negative value, (g) if the simplification value of the selected mesh point is negative and smaller than the reference simplification value, saving the selected mesh point and deleting all saved mesh points altogether, and (h) repeating the steps (d) through (g) until the simplification values of the mesh points on each region boundary line segment become greater than the reference simplification value.

Each of the above methods of generating a mesh for process simulation according to the present invention is thus capable of simplifying the configuration at a high speed, reducing the generation of wasteful meshes, and shortening the period of time required for calculations.

The above and other objects, features, and advantages of the present invention will become apparent from the following description with reference to the accompanying drawings which illustrate examples of the present invention.

DETAILED DESCRIPTION OF THE PREFERRED EMBODIMENTS

1st Embodiment

An operation sequence of a method of generating a mesh for process simulation according to a first embodiment of the present invention will be described below with reference to FIG. 5.

Figure 5:
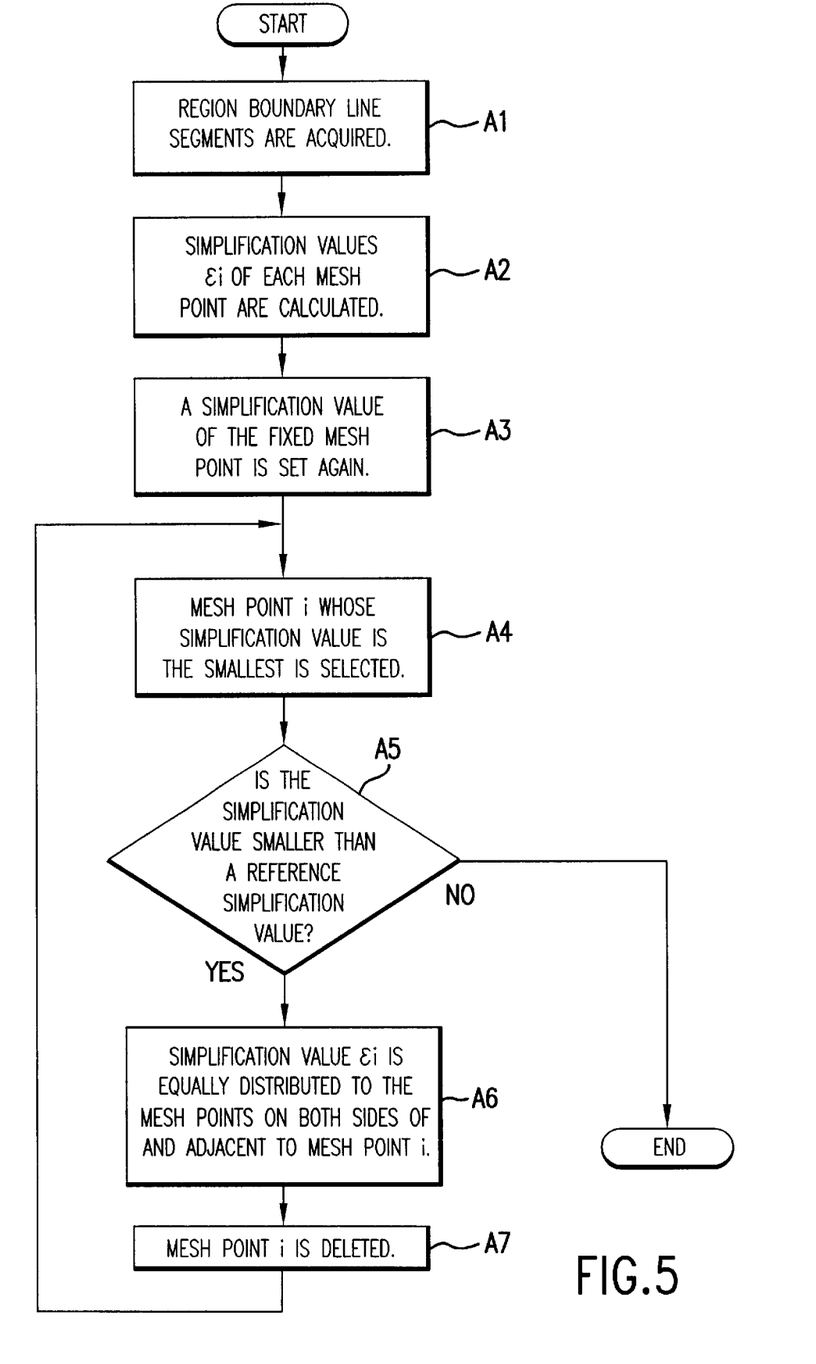
FIG. 5 is a flowchart of an operation sequence of a method of generating a mesh for process simulation according to a first embodiment of the present invention.

In step A1 shown in FIG. 5, region boundary line segments are acquired. The region boundary line segments include the $Si/SiO_2$ boundary, the $SiO_2$/ambient boundary, and the $SiO_2/Si_3N_4$ boundary.

In step A2, simplification values $\epsilon i$ of the mesh points on each of the region boundary line segments are calculated. A simplification value $\epsilon i$ represents a distance that the mesh points move when the corresponding mesh point is deleted. The smaller the simplification value $\epsilon i$, the smaller the effect that the simplification has on a change in the configuration.

In step A3, a node where three or more materials contact each other on each region boundary line segment is defined as a fixed mesh point, and the simplification value of the fixed mesh point is set to a value sufficiently larger than a reference simplification value, so that the mesh point will not be moved.

In step A4, of the mesh points on each region boundary line segment, mesh point i whose simplification value $\epsilon i$ is the smallest is selected.

In step A5, if simplification value $\epsilon i$ of selected mesh point i is smaller than the reference simplification value, then simplification value $\epsilon i$ of selected mesh point i is equally distributed to the mesh points on both sides of and adjacent to mesh point i in step A6.

In step A7, mesh point i is deleted.

The above process is repeated until the simplification values of all the mesh points in the region boundary line segments become greater than the reference simplification value.

A specific example of how the method according to the first embodiment operates will be described below with reference to FIGS. 6(A) through 6(C).

Figure 6A:
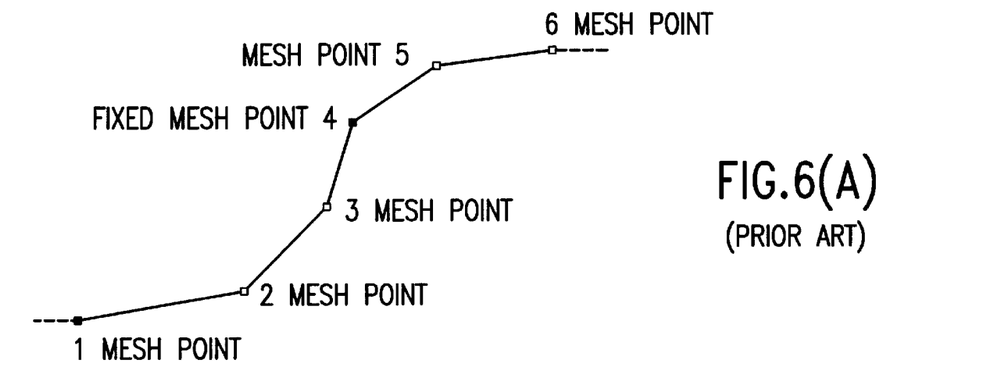
FIGS. 6(A), 6(B), and 6(C) are diagrams showing the manner in which the method according to the first embodiment operates.
Figure 6B:
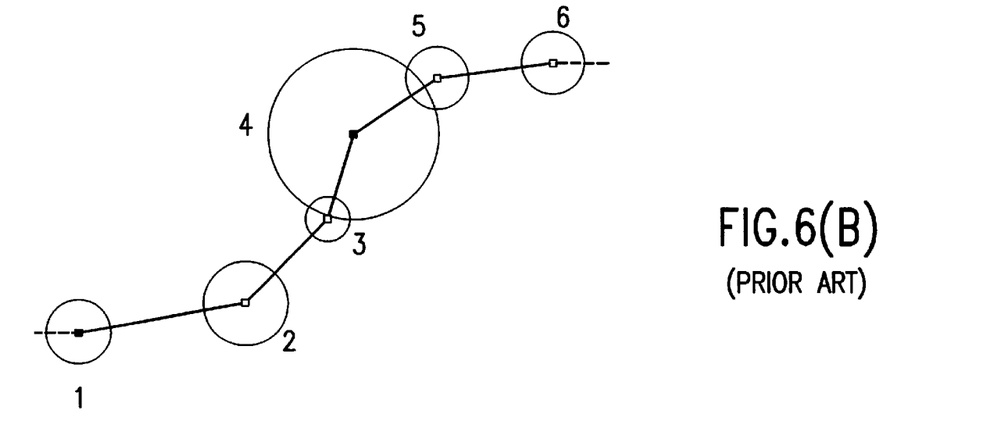
Figure 6C:
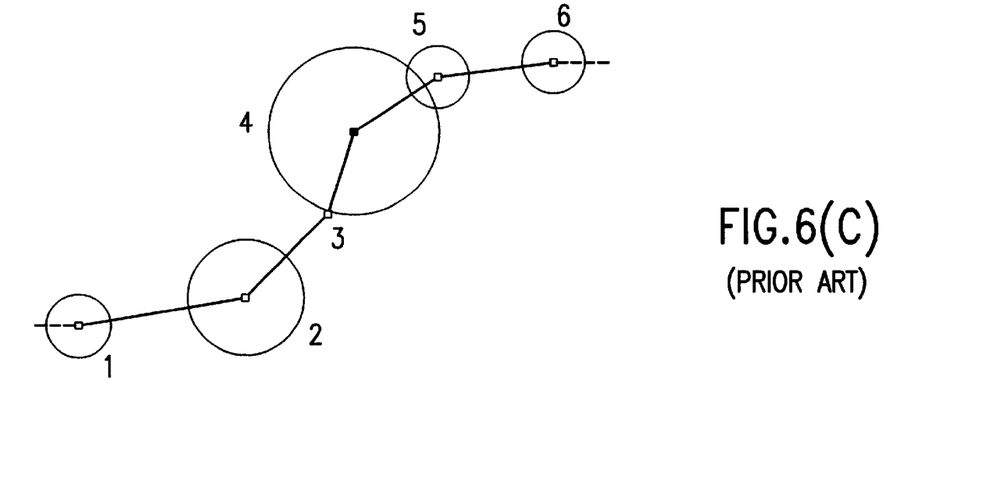

FIGS. 6(A) through 6(C) show at an enlarged scale a portion of the LOCOS configuration illustrated in FIG. 1.

FIG. 6(A) shows the LOCOS configuration in an initial stage. Simplification values $\epsilon i$ of mesh points 1–6 are calculated. Simplification value ϵi represents a distance that the mesh points move when the corresponding mesh point is deleted. The smaller simplification value ϵi, the smaller the effect that the simplification has on a change in the configuration. In FIGS. 6(A) through 6(C), the simplification value of each mesh point is indicated by the size of a circle at the mesh point.

In FIG. 6(A), mesh point 4 is a node where three or more materials contact each other. Simplification value ϵi of mesh point 4 is set to a sufficiently large value, and mesh point 4 is defined as a fixed mesh point, as shown in FIG. 6(B).

Of the mesh points, mesh point i whose simplification value ϵi is the smallest is selected, i.e., mesh point 3 shown in FIG. 6(B) is selected.

If simplification value ϵi of selected mesh point i is smaller than a predetermined reference value, then mesh point i is deleted. Simplification value ϵi of deleted mesh point i is equally distributed to the mesh points on both sides of and adjacent to mesh point i.

The above process is repeated until the simplification values of all the mesh points become greater than the reference simplification value.

2nd Embodiment

An operation sequence of a method of generating a mesh for process simulation according to a second embodiment of the present invention will be described below with reference to FIG. 7.

In the method according to the first embodiment, simplification value ϵi of mesh point i to be deleted is equally distributed to the mesh points on both sides of and adjacent to mesh point i.

Figure 7:
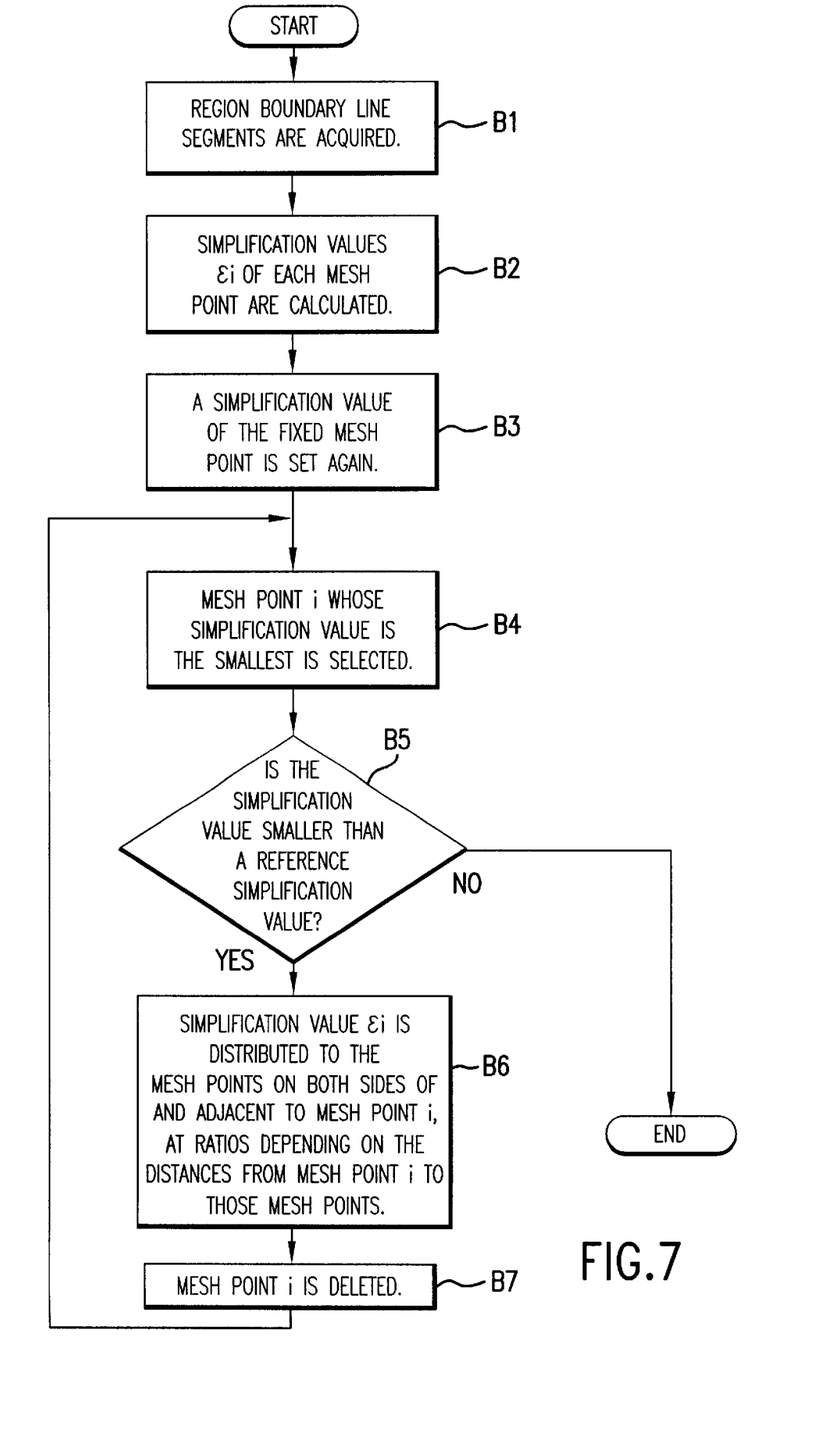
FIG. 7 is a flowchart of an operation sequence of a method of generating a mesh for process simulation according to a second embodiment of the present invention.

In the method according to the second embodiment, simplification value ϵi of mesh point i to be deleted is distributed to the mesh points on both sides of and adjacent to mesh point i, at ratios depending on the distances from mesh point i to those mesh points, in step B6 shown in FIG. 7. As a result, the distribution of simplification value ϵi can be changed depending on how closely or coarsely the mesh points are spaced.

3rd Embodiment

Figure 8:
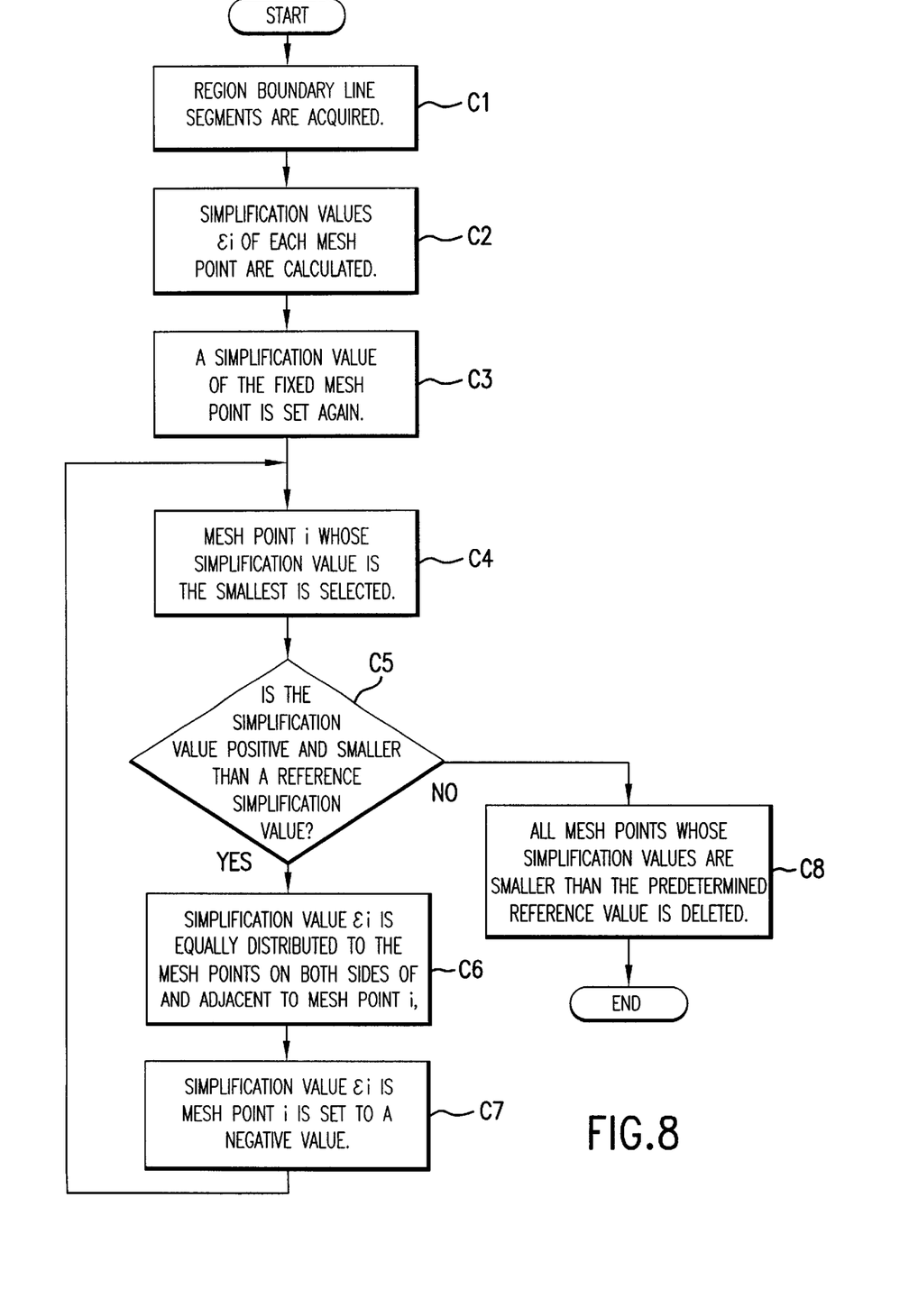
FIG. 8 is a flowchart of an operation sequence of a method of generating a mesh for process simulation according to a third embodiment of the present invention.

An operation sequence of a method of generating a mesh for process simulation according to a third embodiment of the present invention will be described below with reference to FIG. 8.

In the method according to the first embodiment, if simplification value ϵi of selected mesh point i is smaller than a predetermined reference value, then mesh point i is deleted.

In the method according to the third embodiment, if simplification value ϵi of selected mesh point i is positive and smaller than a predetermined reference value in step C5, then simplification value ϵi of mesh point i is equally distributed to the mesh points on both sides of and adjacent to mesh point i in step C6, and simplification value ϵi is set to a negative value in step C7.

As a result, all mesh points i whose simplification values ϵi are smaller than the predetermined reference value can be deleted altogether in step C8. Consequently, required calculations can be performed efficiently.

The present invention offers the following advantages:

In the method according to the first embodiment, for simplifying the configuration in the method of generating a mesh for process simulation, the simplification value of a selected mesh point is equally distributed to the mesh points on both sides of and adjacent to the selected mesh point. Therefore, the configuration can be simplified at a high speed.

In the method according to the second embodiment, the simplification value of a selected mesh point is distributed to the mesh points on both sides of and adjacent to the mesh point, at ratios depending on the distances from the selected mesh point to those mesh points. Therefore, the distribution of the simplification value can be changed depending on how closely or coarsely the mesh points are spaced.

In the method according to the third embodiment, if the simplification value of a selected mesh point is positive and smaller than a predetermined reference value, then the simplification value is set to a negative value. As a result, all the mesh points whose simplification values are smaller than the predetermined reference value can be deleted altogether. Consequently, required calculations can be performed efficiently.

While preferred embodiments of the present invention have been described using specific terms, such description is for illustrative purposes only, and it is to be understood that changes and variations may be made without departing from the spirit or scope of the following claims.

What is claimed is:

1. A method of generating a mesh for process simulation, comprising the steps of:

(a) acquiring region boundary line segments;

(b) calculating simplification values of mesh points on each of said region boundary line segments;

(c) defining a node where at least three materials contact each other on each region boundary line segment as a fixed mesh point, and setting the simplification value of the fixed mesh point to a value sufficiently larger than a reference simplification value thereby to make the fixed mesh point immovable;

(d) selecting the mesh point whose simplification value is the smallest from the mesh points on each region boundary line segment;

(e) if the simplification value of the selected mesh point is smaller than said reference simplification value, distributing the simplification value of the selected mesh point to the mesh points on both sides of and adjacent to the selected mesh point;

(f) deleting said selected mesh point; and (g) repeating said steps (d) through (f) until the simplification values of all the mesh points on each region boundary line segment become greater than said reference simplification value.

2. The method of claim 1, wherein the simplification value of the selected mesh point is distributed equally between the mesh points on both sides and adjacent to the selected mesh point.

3. A method of generating a mesh for process simulation, comprising the steps of:

(a) acquiring region boundary line segments;

(b) calculating simplification values of mesh points on each of said region boundary line segments;

(c) defining a node where at least three materials contact each other on each region boundary line segment as a fixed mesh point, and setting the simplification value of the fixed mesh point to a value sufficiently larger than a reference simplification value thereby to make the fixed mesh point immovable;

(d) selecting the mesh point whose simplification value is the smallest from the mesh points on each region boundary line segment;

(e) if the simplification value of the selected mesh point is smaller than said reference simplification value, distributing the simplification value of the selected mesh point to the mesh points on both sides of and adjacent to the selected mesh point, at ratios depending on the distances from said selected mesh point to the mesh points;

(f) deleting said selected mesh point; and (g) repeating said steps (d) through (f) until the simplification values of all the mesh points on each region boundary line segment become greater than said reference simplification value.

4. A method of generating a mesh for process simulation, comprising the steps of:

(a) acquiring region boundary line segments;

(b) calculating simplification values of mesh points on each of said region boundary line segments;

(c) defining a node where at least three materials contact each other on each region boundary line segment as a fixed mesh point, and setting the simplification value of the fixed mesh point to a value sufficiently larger than a reference simplification value thereby to make the fixed mesh point immovable;

(d) selecting the mesh point whose simplification value is the smallest from the mesh points on each region boundary line segment;

(e) if the simplification value of the selected mesh point is positive and smaller than said reference simplification value, equally distributing the simplification value of the selected mesh point to the mesh points on both sides of and adjacent to the selected mesh point;

(f) setting the simplification value of said selected mesh point to a negative value;

(g) if the simplification value of the selected mesh point is negative and smaller than said reference simplification value, saving the selected mesh point and deleting all saved mesh points altogether; and (h) repeating said steps (d) through (g) until the simplification values of the mesh points on each region boundary line segment become greater than said reference simplification value.

* * * * *